Nov. 23, 1965     E. D. WEIL     3,219,710
NEW PERCHLOROCARBONS AND METHODS FOR THEIR PREPARATION
Filed Oct. 31, 1961
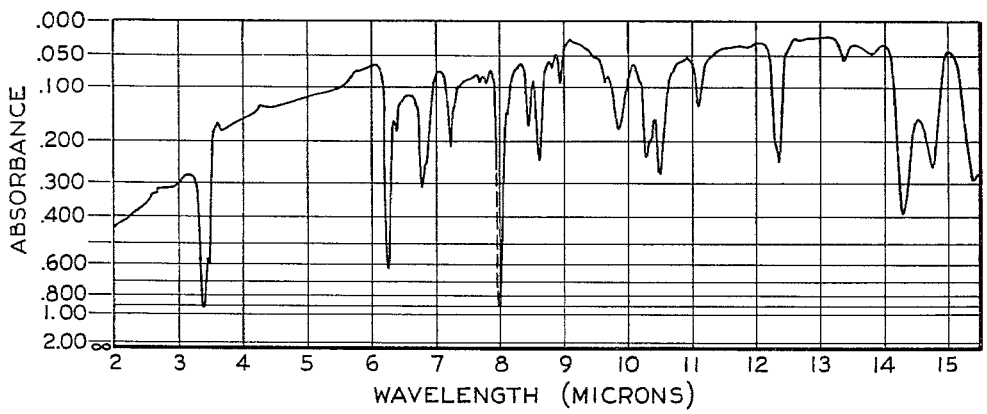
FIG. 1   $C_{10}Cl_{10}$ OF MELTING POINT 125° (NUJOL SMEAR)
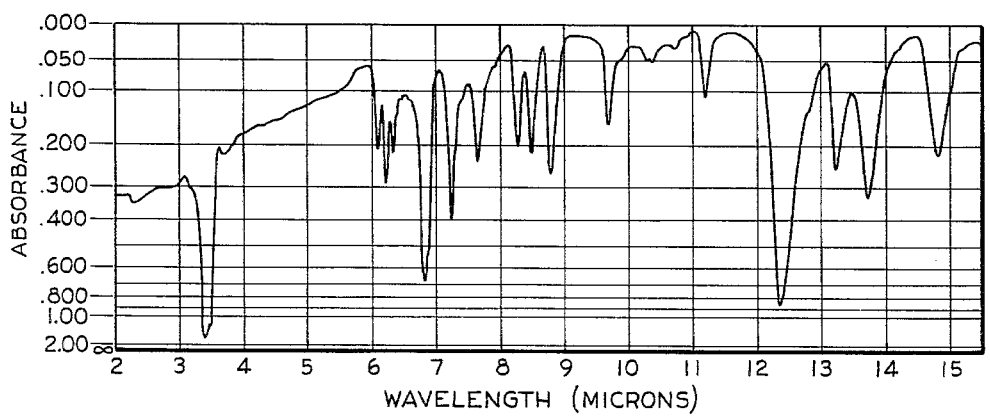
FIG. 2   $C_{10}Cl_{10}$ OF MELTING POINT 111° (NUJOL SMEAR)
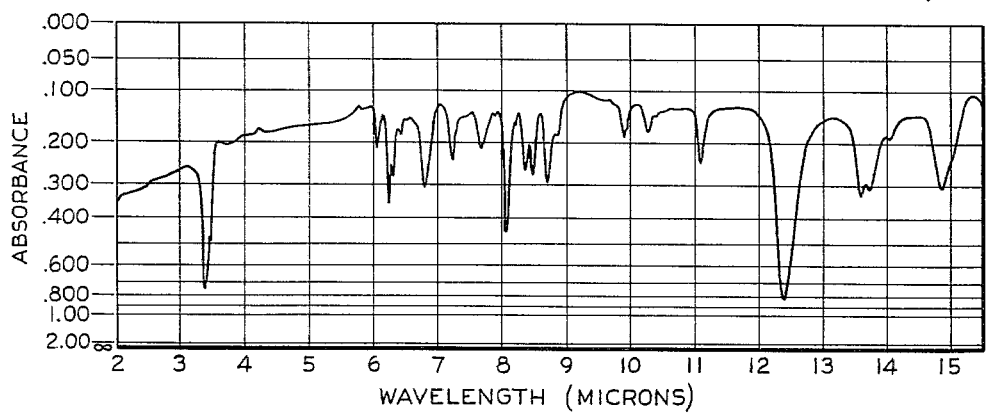
FIG. 3   $C_{10}Cl_{10}$ OF MELTING POINT 82° (NUJOL SMEAR)

United States Patent Office 3,219,710
Patented Nov. 23, 1965

3,219,710
NEW PERCHLOROCARBONS AND METHODS
FOR THEIR PREPARATION
Edward D. Weil, Lewiston, N.Y., assignor to Hooker
Chemical Corporation, Niagara Falls, N.Y., a corporation of New York
Filed Oct. 31, 1961, Ser. No. 148,898
9 Claims. (Cl. 260—648)

This invention comprises novel perchlorinated cyclic compounds and methods for their preparation, said compositions being useful as lubricants, polymer intermediates, insecticides and oil adducts.

More particularly, this invention relates to perchlorinated cyclic compounds of unknown chemical structure, and having unexpected properties, prepared by the isomerization of the following known chlorocarbon:

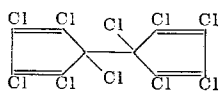

This well-known chlorocarbon of melting point one hundred and twenty-five degrees centigrade (also reported as one hundred twenty-three to one hundred twenty-four degrees centigrade) and empirical formula $C_{10}Cl_{10}$ readily undergoes isomerization by either of two different methods, upon heating from above one hundred twenty-five to about two hundred and forty degrees centigrade, preferably one hundred and thirty to two hundred and thirty-five degrees centigrade, or by exposing the known chlorocarbon $C_{10}Cl_{10}$ to a strong Lewis acid, preferably aluminum chloride at any temperature between about minus twenty degrees to two hundred degrees centigrade. The isomerization products formed through either of the above described inventive processes are two different compounds of unknown structure melting at about eighty-two and one hundred and eleven degrees centigrade, respectively, and having the same empirical formula as the known parent chlorocarbon, that is $C_{10}Cl_{10}$. To further characterize these new $C_{10}Cl_{10}$ isomers as distinct chemical compounds, the infrared absorption spectra of the new isomers and of the prior art isomer (in Nujol mulls) are depicted in the appended figures. Marked differences in the spectra are evident especially in the 7 to 9 micron wave length range.

The two isomers of unknown structure whose melting point is eighty-two degrees and one hundred and eleven degrees centigrade, respectively, are formed in roughly equal amounts during the disclosed inventive processes. The exact ratio of the components formed depends on the reaction conditions, but the combined yield of the two isomers based upon the amount of the known starting chlorocarbon material used ($C_{10}Cl_{10}$, melting point one hundred and twenty-five degrees centigrade) is substantially quantitative in most cases.

In their composition aspects, the two new isomeric compositions of this invention offer several important advantages in kind over the known parent compound $C_{10}Cl_{10}$ of melting point one hundred and twenty-five degrees centigrade. For example, in view of its dienic structure, the known compound has been found to be remarkably inert or unreactive and hence unsuitable as an intermediate. This unreactivity is especially noticeable in the Diels-Alder type reactions where it might well have been expected to show activity. See McBee et al., (J. Am. Chem. Soc. 77 4377).

Since the principal commercial use of perchlorocyclopentadiene compounds, such as the parent $C_{10}Cl_{10}$ compound, has been as dienes starting materials in the Diels-Alder reaction, to prepare adducts useful as insecticides, polymer intermediates, and lubricating oil adducts, the composition has had no utility as an intermediate. In contrast, the two novel isomeric compositions of this invention undergo Diels-Alder type reactions with olefinic compounds, and therefore lend themselves as starting materials to prepare insecticides, polymer intermediates and lubricating oil adducts.

A second important difference of kind between the known parent $C_{10}Cl_{10}$ compound and the two novel isomers of this invention is the totally different product they yield upon exhaustive chlorination. Whereas the parent $C_{10}Cl_{10}$ compound upon exhaustive chlorination yields the compound having the empirical formula $C_{10}Cl_{12}$ of the structure:

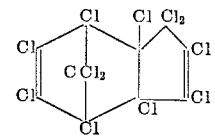

which has no known utility, the new isomers under the same conditions, give substantially quantitative yields of the compound $C_{10}Cl_{14}$ which has the empirical formula $C_{10}Cl_{14}$ and the structure:

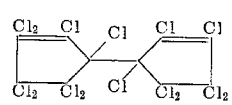

This $C_{10}Cl_{14}$ compound is disclosed to be insecticidal in U.S. Patent 2,911,448, but no commercially feasible process for its production has hitherto been known. Thus, the isomers of this invention offer the ancillary advantage upon chlorination of yielding a valuable insecticide in good yield from a commercially feasible process where no commercially suitable route existed before.

Yet a third difference in kind between applicant's novel isomers and the known $C_{10}Cl_{10}$ parent compound of the prior art arises from their advantageous physical characteristics. For instance, the two new $C_{10}Cl_{10}$ isomeric compounds individually or in admixture are highly oil-soluble, low melting solids. Thus, the two low melting chlorocarbons when formed together by either of the disclosed processes may be incorporated into or blended with lubricating oils, cutting oils, or greases to improve their load-bearing properties. On the other hand, the known chlorocarbon $C_{10}Cl_{10}$ is relatively insoluble in oil, being a comparatively high melting solid. For example, in a SAE 90 gear oil at thirty-two degrees Fahrenheit the prior art isomer of $C_{10}Cl_{10}$ had less than one percent solubility, whereas the new $C_{10}Cl_{10}$ isomer of melting point one hundred and eleven degrees Fahrenheit is soluble to over ten percent by weight, the new $C_{10}Cl_{10}$ isomer of melting point eighty-two degrees Fahrenheit is soluble to over fifteen percent by weight, and the mixture of the two isomers (about 1:1) is soluble to over twenty-five percent by weight.

Another advatage which the inventive compositions offer especially where cost is a factor, is that they may be used in admixture in the ratio in which they are formed without further treatment. In fact, such mixtures have a significant advantage for uses such as oil additives, in that they remain liquid at room temperature or slightly above, and, therefore can be blended with oils more readily than can solid compounds, and such mixtures have higher solubility (or conversely, lower cloud points) than the individual isomers. Or, the compositions may be enriched or completely separated by the usual conventional separation, purification and isolation procedures well known to the art, including but not limited to, fractional crystallization, distillation, chromatographic separation, chilling, and centrifugation.

In its process aspects, this invention offers the advantage of two novel related but distinct, commercially feasible processes for obtaining the two novel compositions of this invention in good yield. For the sake of simplicity the non-catalytic heating process is referred to as the "thermal" process and the process which uses a Lewis acid catalyst is called the "catalyzed" process.

In the "thermal" process, the known $C_{10}Cl_{10}$ isomer is melted and held at a chosen temperature above one hundred and twenty-five and below about two hundred and forty degrees centigrade. At temperatures under one hundred and twenty-five degrees centigrade, the reaction will proceed to a scarcely detectible degree, if at all, while at temperatures above two hundred and forty degrees centigrade, the known breakdown of the starting material $C_{10}Cl_{10}$ occurs to yield degradation products of greater and lesser molecular weight. A preferred thermal process temperature range is about one hundred and thirty to about two hundred and thirty-five degrees centigrade. Reaction times of a few minutes at the higher temperatures and up to a day at the lower temperatures are most suitable. A solvent or flux is not necessary, but can be used if desired. A suitable solvent, to facilitate heat transfer, can conveniently be the product isomers themselves (e.g., a "heel" from a previous batch).

In the "catalytic" process, the known $C_{10}Cl_{10}$ isomer in the presence of a catalytic amount (which can range from a few parts per million up to several percent), of a Lewis acid is heated from about minus twenty degrees centigrade to about one hundred and fifty degrees centigrade, preferably ten degrees centigrade to sixty degrees centigrade. Aluminum chloride is particularly efficaceous, permitting the preparative reaction to take place, in a suitable inert solvent such as methylene chloride or ethylene chloride, at even sub-zero temperatures, that is as low as minus ten degrees centigrade. Conveniently, the reaction is carried out at or slightly above ambient temperature, and substantially completes itself in less than a day. The product in solution is then washed free of the catalyst, e.g., by water, and the solvent removed by distillatiion. While aluminum chloride is preferred because of the rapidity of the reaction in its presence, it will be evident to those skilled in the art that other Lewis acid catalysts can be employed, such as, for example, ferric chloride, antimony chloride, $BF_3$, $SnCl_4$, $MoCl_5$, $TiCl_4$, $ZnCl_2$, $WCl_6$, $BiCl_3$, $ZrCl_4$, $NiCl_2$, $CoCl_2$, alumina, acidic clays and the like. Processes which may be viewed as hybrids of the "thermal" and "catalytic" processes can also be employed, i.e., catalytic amounts of Lewis acids may be added to the known $C_{10}Cl_{10}$ under conditions of the thermal process in order to speed up the reaction.

The following examples are given for purposes of illustration of this invention, and are not to be construed as limiting it except as set forth in the claims.

Example 1

Five hundred parts of the known $C_{10}Cl_{10}$, melting point one hundred and twenty-five degrees (prapared as described by McBee et al. (J. Am. Chem. Soc. 77 4372), is heated at one hundred and forty to one hundred and forty-one degrees for twenty-five hours. The infrared spectrum establishes that none of the original isomer is present.

The product when cooled to room temperature is a light red viscous syrup, which is dissolved in glacial acetic acid and chilled, depositing one hundred and ninety parts by weight of crystalline solid. This is removed by filtration, and recrystallized, from hot glacial acetic acid (in which it is only moderately soluble), to obtain pale yellow platelets of melting point one hundred and eleven degrees.

*Analysis.*—Calcd. for $C_{10}Cl_{10}$: Cl, 74.7 percent. Found: Cl, 74.3 percent. Molecular weight Calcd.: 475. Found 473.

The original mother liquor is treated with water to the point of incipient oiling-out, and then evaporated slowly at room temperature to obtain oily crystals which are isolated by filtration. After several recrystallizations from acetic acid, a pure crystalline product is obtained which melts sharply at eighty-two degrees.

*Analysis.*—Calcd. for $C_{10}Cl_{10}$: Cl, 74.7 percent. Found: Cl, 74.3 percent. Molecular weight Calcd.: 475. Found: 468.

Using these two pure isomers as infrared standards, a sample of the original unseparated "crude" product is analyzed by infrared and found to comprise about forty-five percent of the isomer of melting point one hundred and eleven degrees and about fifty-five percent of the isomer of melting point eighty-one degrees.

Example 2

In an experiment designed to measure the rate of formation of these isomers, and to determine their thermal stability at the reaction temperature, the known $C_{10}Cl_{10}$ isomer, melting point one hundred and twenty-five degrees, is heated at one hundred and forty degrees and samples of the reaction product analyzed by infrared at various intervals.

| Reaction Time | Percent $C_{10}Cl_{10}$, M.P. 125° | Percent $C_{10}Cl_{10}$, M.P. 111° | Percent $C_{10}Cl_{10}$, M.P. 82° |
|---|---|---|---|
| 0 | 100 | 0 | 0 |
| 3 Hrs | 45 | 20 | 35 |
| 14 Hrs | 2 | 42 | 56 |
| 38 Hrs | 0-1 | 44 | 56 |
| 86 Hrs | 0-1 | 44 | 56 |

Example 3

The known $C_{10}Cl_{10}$, melting point one hundred and twenty-five degrees, is heated at one hundred and thirty degrees, and analyzed periodically by infrared. Six hours are required for the percent $C_{10}Cl_{10}$, melting point one hundred and twenty-five degrees, to drop to fifty percent, the product being about equal amounts of the one hundred and eleven degree and eighty-two degree isomers.

Example 4

The known $C_{10}Cl_{10}$, melting point one hundred and twenty-five degrees centigrade, is heated to two hundred and thirty-five degrees centigrade. After five minutes, infrared examination showed complete conversion to a mixture of forty-five percent of $C_{10}Cl_{10}$, melting point one hundred and eleven degrees centigrade, and fifty-five percent of $C_{10}Cl_{10}$, melting point eighty-two degrees centigrade.

Example 5

To a solution of twenty-five parts of the known $C_{10}Cl_{10}$, melting point one hundred and twenty-five degrees, in one hundred and fifty parts of methylene chloride is added five parts of aluminum chloride (powder); the mixture is stirred for twenty hours at room temperature. The resultant purple solution is then poured into water with agitation, filtered and the organic layer of the filtrate separated, washed with water, and evaporated to remove methylene chloride, leaving as product a viscous syrup. Infrared analysis shows this to be fifteen percent $C_{10}Cl_{10}$, melting point one hundred and twenty-five degrees, fifty-five percent $C_{10}Cl_{10}$, melting point one hundred and ten degrees, and thirty percent $C_{10}Cl_{10}$, melting point eighty-two degrees.

Example 6

In a repetition of the above experiment, the solution of reactants is refluxed for one day. The infrared spectrum of the product shows complete conversion of the $C_{10}Cl_{10}$, melting point one hundred and twenty-five degrees, to the two new isomers, with some tars and residues formed as by-products.

Example 7

Ten parts of the $C_{10}Cl_{10}$ isomer of melting point one hundred and eleven degrees in one hundred parts of carbon tetrachloride is treated with gaseous chlorine at reflux under illumination by a mercury vapor lamp for about twenty hours. The solution is then evaporated and the solid residue recrystallized from heptant to obtain a high yield of the known $C_{10}Cl_{14}$, melting point one hundred and sixty-nine degrees. The product is characterized by comparison of its infrared spectrum with that of an authentic speciment prepared in the manner of McBee et al., loc. cit.

Example 8

Three parts of $C_{10}Cl_{10}$, melting point eighty-two degrees, in thirty parts of carbon tetrachloride was chlorinated for twenty hours as in the preceding example, with resultant formation of the same $C_{10}Cl_{14}$ product in high yield. A similar result was also obtained by chlorination of the mixed product of Example 3.

On the other hand, chlorination of the known $C_{10}Cl_{10}$, melting point one hundred and twenty-five degrees, under these conditions gave only the known chlorocarbon $C_{10}Cl_{12}$, melting point two hundred and twenty-five degrees.

Example 9

Ten parts of $C_{10}Cl_{10}$, melting point one hundred and eleven degrees, and eighteen parts of bicyclo (2.2.1) heptadiene-2,5 were heated under nitrogen at one hundred degrees for one day, then stripped under aspirator vacuum at one hundred degrees to obtain fourteen parts of a brownish semi-solid substance.

The infrared spectrum showed that essentially all of the $C_{10}Cl_{10}$ had reacted.

*Analysis.*—Calcd. for $C_{10}Cl_{10}(C_7H_8)_2$: Cl, 53.8. Found: Cl, 53.3.

I claim:

1. The process of contacting the chlorocarbon $C_{10}Cl_{10}$ of the melting point one hundred and twenty-five degrees centigrade, of the structure:

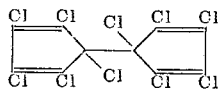

with a catalytic amount of a Lewis acid catalyst selected from the group consisting of ferric chloride, aluminum chloride, antimony chloride, $BF_3$, $SnCl_4$, $MoCl_5$, $TiCl_4$, $ZnCl_2$, $WCl_6$, $BiCl_3$, $ZrCl_4$, $NiCl_2$, $CoCl_2$, alumina and acidic clay, until a substantial amount of $C_{10}Cl_{10}$ products melting at about one hundred and eleven degrees centigrade and about eighty-two degrees centigrade, respectively, are formed.

2. The process of claim 1 in which the chlorocarbon $C_{10}Cl_{10}$ is heated in the presence of the Lewis acid catalyst.

3. The process of claim 1 in which the Lewis acid is aluminum chloride.

4. The process of heating to a temperature from above 125 degrees centigrade to about 240 degrees centigrade, the chlorocarbon $C_{10}Cl_{10}$ of melting point one hundred and twenty-five degrees centigrade, of the structure:

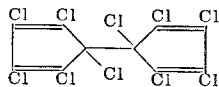

until a substantial amount of chlorocarbon product; having the empirical formula $C_{10}Cl_{10}$ and melting at about one hundred and eleven degrees centigrade and about eighty-two degrees centigrade, respectively, are formed.

5. The process of heating the chlorocarbon $C_{10}Cl_{10}$ of melting point one hundred and twenty-five degrees centigrade of the structure:

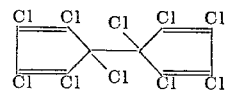

at a temperature of from above one hundred twenty-five degrees centigrade to two hundred forty degrees centigrade until a chlorocarbon product selected from the group consisting of chlorocarbon products having the empirical formula $C_{10}Cl_{10}$ and melting at about one hundred and eleven degrees centigrade and about eighty-two degrees centigrade, respectively, are formed.

6. A process for the production of the chlorocarbon $C_{10}Cl_{14}$ which comprises contacting the chlorocarbon $C_{10}Cl_{10}$ of the melting point one hundred and twenty-five degrees centigrade of the structure:

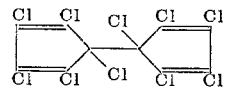

with a catalytic amount of a Lewis acid catalyst selected from the group consisting of ferric chloride, aluminum chloride, antimony chloride, $BF_3$, $SnCl_4$, $MoCl_5$, $TiCl_4$, $ZnCl_2$, $WCl_6$, $BiCl_3$, $ZrCl_4$, $NiCl_2$, $CoCl_2$, alumina and acidic clay, until a substantial amount of $C_{10}Cl_{10}$ products melting at about one hundred and eleven degrees centigrade and about eighty-two degrees centigrade, respectively, are formed and contacting these $C_{10}Cl_{10}$ isomers with chlorine, until substantially two moles of chlorine are absorbed.

7. The process of claim 6 in which the Lewis acid is aluminum chloride.

8. A process for the production of the chlorocarbon $C_{10}Cl_{14}$ which comprises heating to a temperature from above 125 degrees centigrade to about 240 degrees centigrade, the chlorocarbon $C_{10}Cl_{10}$ of melting point one hundred and twenty-five degrees centigrade of the structure:

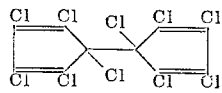

until a substantial amount of chlorocarbon products having the empirical formula $C_{10}Cl_{10}$ and melting points of one hundred and eleven degrees centigrade and eighty-two degrees centigrade, respectively, are formed, and then contacting these rearranged isomers with chlorine until substantially two moles of chlorine are absorbed.

9. A mixture of isomeric chlorocarbons of the structure $C_{10}Cl_{10}$ having melting points of about 82 degrees and 111 degrees centigrade, which mixture is selected from the group consisting of (1) the product of the process of contacting the chlorocarbon $C_{10}Cl_{10}$ of melting point of 125 degrees centigrade and structure

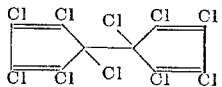

with a catalytic amount of aluminum chloride and (2) the product of the process of heating the chlorocarbon $C_{10}Cl_{10}$ of melting point of 125 degrees centigrade and structure

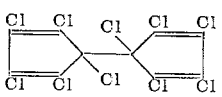

to a temperature from above 125 degrees centigrade to about 240 degrees centigrade; until a substantial amount of a mixture of $C_{10}Cl_{10}$ products melting at about 82 degrees and 111 degrees centigrade is formed.

(References on following page)

References Cited by the Examiner

UNITED STATES PATENTS

| | | | |
|---|---|---|---|
| 2,732,409 | 1/1956 | Ladd | 260—648 |
| 2,849,499 | 8/1958 | McBee et al. | 260—648 |
| 2,908,723 | 10/1959 | Rucker | 260—648 |
| 2,911,448 | 11/1959 | McBee et al. | 260—648 |
| 2,934,470 | 4/1960 | Rucker | 260—648 |

OTHER REFERENCES

McBee et al.: "Jour. Am. Chem. Soc.," vol. 77 (August 1955) pp. 4375–9.

McBee et al.: "Jour. Am. Chem. Soc.," vol. 78 (1956) pp. 996–7.

Roedig et al.: "Angewandte Chemie," vol. 67 (1955) pp. 302–3.

LEON ZITVER, *Primary Examiner.*

ALPHONSO D. SULLIVAN, *Examiner.*